Dec. 10, 1957     M. C. STEELE     2,816,283
SEMICONDUCTOR NULL DETECTOR
Filed March 30, 1956
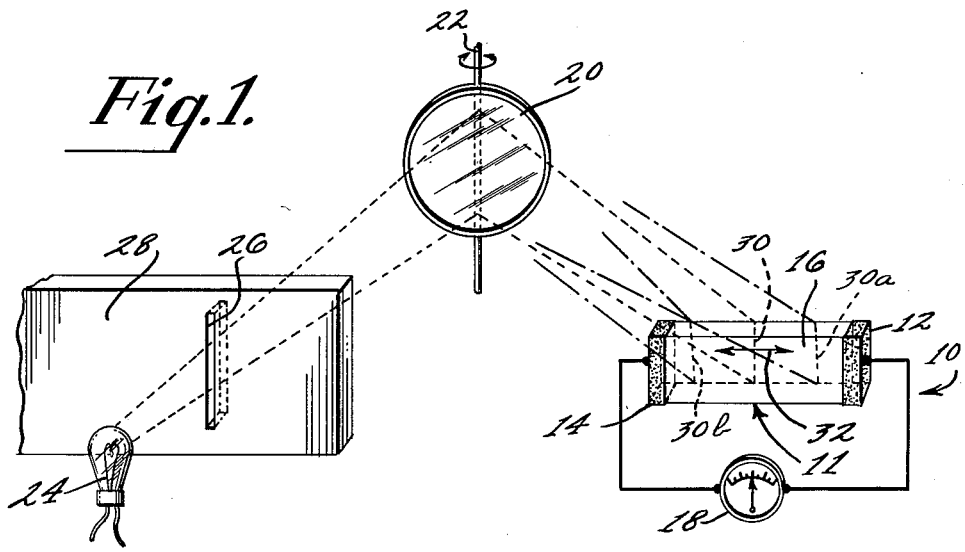
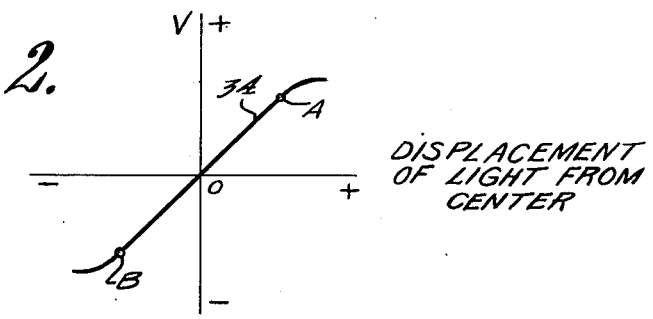
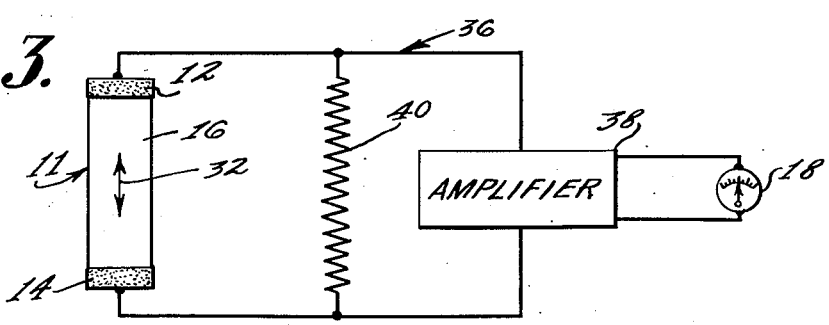
INVENTOR.
Martin C. Steele
BY
ATTORNEY.

United States Patent Office 2,816,283
Patented Dec. 10, 1957

2,816,283

SEMICONDUCTOR NULL DETECTOR

Martin C. Steele, Roosevelt, N. J., assignor to Radio Corporation of America, a corporation of Delaware Application March 30, 1956, Serial No. 575,016

8 Claims. (Cl. 340—282)

This invention relates to null detectors, and more particularly to null detector circuits comprising semiconductive materials utilizing the photovoltaic effects thereof. The null detectors of the present invention are particularly applicable to indicate the null, and/or to amplify the galvanometer deflections, of a suspension type galvanometer.

The use of suspension type galvanometers wherein a mirror is fixed to a torsion wire, and adapted to rotate therewith, is quite common and extensive in potentiometer and bridge type circuits. The function of the galvanometer is to indicate a null point, or zero deflection, when the bridge is balanced or when voltages are equalized. This null point is usually indicated by the position of a light beam reflected from the mirror. Such galvanometers require a relatively large amount of space to permit the movement of the reflected light beam on a relatively large scale. Photoconductive devices have been employed in the past to indicate the relative intensity of the reflected light beam, but such devices required external sources of voltage because they depended upon the photoconductive properties of the device rather than upon the photovoltaic effects thereof.

Accordingly, it is an object of the present invention to provide an improved null detector utilizing the photovoltaic effects of a semiconductor double diode in a novel manner.

It is another object of the present invention to provide an improved null detector comprising a semiconductor double diode that is relatively free from temperature effects, such as thermoelectric potentials developed due to localized heating caused by the light beam.

Still another object of the present invention is to provide an improved null detector comprising a novel semiconductor double diode that does not require an external source of voltage for its operation.

A further object of the present invention is to provide an improved null detector comprising a semiconductor double diode wherein a pair of zones of one conductivity-type is separated by and contiguous with a zone of opposite conductivity-type, or intrinsic conductivity-type; and wherein the middle zone can be greater than the diffusion length of the carriers of the semiconductor.

A still further object of the present invention is to provide an improved combination of photovoltaic means with a suspension type galvanometer for indicating the null point, or relative positon therefrom, of galvanometers.

These and related objects and advantages of the present invention are attained in a novel null detector circuit employing a semiconductor double diode. The double diode comprises a body of semiconductive material having a pair of zones of one conductivity-type separated and contiguous with an elongated uniformly symmetrical zone of an opposite or intrinsic conductivity-type. The null detector circuit utilizes the photovoltaic effects of the semiconductor double diode. When a beam of light is directed upon the elongated middle zone of the semiconductive body midway between the end zones thereof, the open circuit voltage between the end zones is a minimum. As the light beam travels toward either junction, the voltage between the end zones becomes either positive or negative, depending upon the position of the beam from the center of the middle zone. A null detector in accordance with the present invention may be used to amplify the deflection of a suspension type galvanometer by having the reflected light beam from the mirror of the galvanometer fall upon the elongated middle zone of the semiconductor double diode. If the resulting voltage across the pair of end zones of the semiconductor double diode is weak, conventional amplifying means may be employed.

The novel features of the invention, as well as the invention itself, both as to its organization and method of operation will be understood in detail from the following description when considered in connection with the accompanying drawing in which:

Fig. 1 is a schematic diagram of a null detector circuit of the present invention as used in conjunction with a galvanometer to indicate the null point thereof;

Fig. 2 is a graph indicating the photovoltaic effects of the semiconductor double diode of the null detector circuit of the present invention; and Fig. 3 is a modification of the null detector circuit of the present invention.

Referring now to Fig. 1, there is shown a semiconductor null detector circuit 10, in accordance with the present invention, in conjunction with a galvanometer of the suspension type. The null detector circuit 10 comprises a body 11 of semiconductive material having two similar end zones 12 and 14 of one conductivity-type separated by and contiguous with an elongated uniformly symmetrical middle zone 16 of a different conductivity-type. The middle zone 16 may be either of the opposite or the intrinsic conductivity-type. The pair of end zones 12 and 14 may, for example, comprise indium having a P-type of conductivity, and the middle zone 16 may comprise germanium or silicon of N-type conductivity. Also, the middle zone may be intrinsic germanium or silicon. The middle zone 16 may be alloyed to the end zones 12 and 14 in a manner well known in the art. For the purposes of the present invention the middle zone 16 should be a uniformly symmetrical prismatic wafer. The length of the zone 16 may be relatively greater than the diffusion length of the semiconductor carriers, that is, the electrons and holes responsible for current flow in semiconductive material. The body 11, as described, comprises a semiconductor double diode. Voltage indicating means, such as a sensitive voltmeter 18, is connected between and in series with the end zones 12 and 14 of the semiconductive body 11.

The semiconductive body 11 is disposed to receive reflected light from a mirror 20 fixed to a torsion wire 22 of a conventional suspension type galvanometer. A beam of light from an incandescent or visible light source 24 is directed onto the mirror 20 through a slit 26 in an opaque mask 28. The semiconductive body 11 is disposed to intercept the reflected beam 30 from the mirror 20 at the midpoint of the middle zone 16 when the galvanometer has zero voltage applied to it. It will be understood that the mirror 20 will rotate about its vertical diameter when the galvanometer, of which the torsion wire 22 is a part, is indicating a voltage. Under these conditions the reflected beam 30 from the mirror 20 may move either to the right or to the left, in either of the directions of the double arrow 32, depending upon the polarity of the voltage detected by the galvanometer. If, for example, the voltage indicated by the galvanometer is positive, the reflected beam will move to one side, as at 30a. When the voltage indicated by the galvanometer is negative, the reflected beam will move in an opposite direction, as at 30b.

If the semiconductive body 11 is uniformly symmetrical, the voltmeter 18 will indicate zero when the light beam 30 is reflected to the middle of the zone 16, as when no voltage is being indicated by the galvanometer. This is the null point. When the reflected light beam is shifted to the position 30a, indicating a positive voltage applied to the galvanometer, the voltmeter 18 will read a positive voltage. A negative voltage will be read by the voltmeter 18 when the reflected light beam is in the position 30b, indicating a negative voltage applied to the galvanometer. It will be understood that the null detector circuit 10 of the present invention utilizes the photovoltaic effects of the semiconductive body 11, and an external source of voltage is not necessary in the circuit 10.

The photovoltaic effect of the semiconductive body 11 is illustrated by the characteristic curve 34, in Fig. 2. The curve 34 indicates the change in voltage across the end zones 12 and 14 of the double diode with respect to the displacement of the light beam from the center of the middle zone 16. Thus, the point A on the curve 34 may indicate the voltage on the voltmeter 18 when the light beam on the middle zone 16 is at 30a, and the point B may indicate the reading on the voltmeter 18 when the light beam is at 30b.

When a null detector circuit of extreme sensitivity is desired, or where the sensitivity of the voltmeter 18 and/or the sensitivity of the semiconductive double diode 11 is relatively poor, amplification means may be employed. Referring now to Fig. 3, there is shown a null detector circuit 36 employing an amplifier 38 of conventional design. The end zones 12 and 14 are connected to the input of the amplifier 38, and the output of the amplifier 38 is applied to the voltmeter 18. A load resistor 40 is connected across the end zones 12 and 14 of the semiconductive body 11. The operation of null detector circuit 36, of Fig. 3, is substantially the same as that described for the null detector circuit 10, of Fig. 1. As a beam of light is moved in either of the directions of the double headed arrow 32 from the center of the middle zone 16 of the semiconductive body 11, the voltmeter 18 will indicate either a positive or a negative voltage. A beam of light directed directly at the center of the middle zone 16 of the semiconductive body 11 will cause the voltmeter 18 to indicate zero, thus indicating a null.

A further advantage of this null detector is the null position will not be affected by such extraneous thermal effects as the thermoelectric potential developed due to localized heating brought about by the light beam. At the null point these thermoelectric effects will be substantially cancelled because of the uniform symmetrical construction of the middle zone 16. In addition, there can be a changing ambient temperature of the body 11 without affecting the proper operation of the null detector circuit 10, providing only that air drafts are avoided. To this end it is desirable to enclose the body 11 in a protective container.

What is claimed is:

1. Apparatus comprising a body of semiconductive material having therein a pair of zones of one conductivity-type separated by and contiguous with an elongated relatively longer and uniformly symmetrical zone of a different conductivity-type, said body comprising means to generate a voltage between said pair of zones ranging from one polarity, through zero, and to an opposite polarity when a beam of light is moved along said zone of a different conductivity-type from adjacent one zone of said pair of zones to adjacent the other zone of said pair of zones, and means for connecting voltage indicating means between and in series with said pair of zones of one conductivity-type whereby to indicate said voltage.

2. Apparatus as defined in claim 1, wherein said zone of a different conductivity-type comprises a zone of opposite conductivity-type to said pair of zones, and wherein the length of said zone of opposite conductivity-type is greater than the diffusion length of charge carriers normally therein.

3. Apparatus as defined in claim 1, wherein said zone of a different conductivity-type comprises intrinsic semiconductive material, the length of said intrinsic semiconductive material being greater than the diffusion length of charge carriers normally therein.

4. Apparatus comprising a body of semiconductive material having therein a pair of zones of one conductivity-type separated by and contiguous with an elongated, relatively longer and uniformly symmetrical zone of a different conductivity-type, said body comprising means to generate a voltage between said pair of zones ranging from one polarity, through zero, and to an opposite polarity when a beam of light is moved along said zone of a different conductivity-type from adjacent one zone of said pair of zones to adjacent the other zone of said pair of zones, voltage indicating means, means for connecting said voltage indicating means between and in series with said pair of zones of one conductivity-type whereby to indicate said voltage, means for directing a beam of light onto said zone of a different conductivity-type, and means for moving said beam along said zone of a different conductivity-type.

5. In combination, a galvanometer of the type wherein a mirror is fixed to a torsion wire and adapted to rotate therewith, means for directing a beam of light onto said mirror, a body of semiconductive material comprising a pair of zones of one conductivity-type separated by and contiguous with an elongated uniformly symmetrical zone of a different conductivity-type, said body comprising means to generate a voltage between said pair of zones ranging from one polarity, through zero, and to an opposite polarity when a beam of light is moved along said zone of a different conductivity-type from adjacent one zone of said pair of zones to adjacent the other zone of said pair of zones, said zone of a different conductivity type being disposed to receive reflected light from said mirror, means to connect indicating means between and in series with said pair of zones of one conductivity-type whereby to indicate said voltage, and said zone of a different conductivity-type having a length greater than the diffusion length of charge carriers normally therein.

6. In combination, a galvanometer of the type wherein a mirror is fixed to a torsion wire and adapted to rotate therewith, means for directing a beam of light onto said mirror, a body of semiconductivity material comprising a pair of zones of one conductivity-type separated by and contiguous with an elongated uniformly symmetrical zone of the opposite conductivity-type, said body comprising means to generate a voltage between said pair of zones ranging from one polarity, through zero, and to an opposite polarity when a beam of light is moved along said said zone of a different conductivity-type from adjacent one zone of said pair of zones to adjacent the other zone of said pair of zones, said zone of opposite conductivity-type being disposed to receive reflected light from said mirror, means to connect voltage indicating means between and in series with said pair of zones of one conductivity-type whereby to indicate said voltage, and said voltage indicating means comprising amplifying means.

7. In combination, a galvanometer of the type wherein a mirror is fixed to a torsion wire and adapted to rotate therewith, means for directing a beam of light onto said mirror, a body of semiconductive material comprising a pair of zones of one conductivity-type separated by and contiguous with an elongated, and relatively longer uniformly symmetrical zone of intrinsic conductivity-type, said body comprising means to generate a voltage between said pair of zones ranging from one polarity, through zero, and to an opposite polarity when a beam of light is moved along said zone of an intrinsic conductivity-type from adjacent one zone of said pair of zones to adjacent the other zone of said pair of zones, said zone of intrinsic conductivity-type being disposed to receive reflected light from said mirror, means to connect indicating means between and in series with said pair of zones of one conductivity-type whereby to indicate said voltage, and said zone of intrinsic conductivity-type having a length greater than the diffusion length of charge carriers normally therein.

8. A null detector comprising a body of semiconductive material having therein a pair of zones of one conductivity-type separated by and contiguous with an elongated, relatively longer and uniformly symmetrical zone of a different conductivity-type, said body comprising means to generate a voltage between said pair of zones ranging from one polarity, through zero, and to an opposite polarity when a beam of light is moved along said zone of a different conductivity-type from adjacent one zone of said pair of zones to adjacent the other zone of said pair of zones, voltage indicating means, means for connecting said voltage indicating means between and in series with said pair of zones of one conductivity-type whereby to indicate said voltage, said zone of a different conductivity-type having a length greater than the diffusion length of charge carriers normally therein, means for directing a beam of light onto a relatively small portion of said zone of a different conductivity-type, and means for moving said beam along said zone of a different conductivity-type.

References Cited in the file of this patent

UNITED STATES PATENTS

| | | |
|---|---|---|
| 2,067,613 | McMaster | Jan. 12, 1937 |
| 2,487,024 | Mathison | Nov. 1, 1949 |
| 2,694,804 | Wagner | Nov. 16, 1954 |